(12) United States Patent  (10) Patent No.: US 9,022,432 B2
Firestine  (45) Date of Patent: May 5, 2015

(54) APPARATUS AND METHOD OF COUPLING ELECTRICAL CONDUIT

(76) Inventor: Zachariah John Firestine, Spencerville, IN (US)

(*) Notice: Subject to any disclaimer, the term of this patent is extended or adjusted under 35 U.S.C. 154(b) by 452 days.

(21) Appl. No.: 13/544,495

(22) Filed: Jul. 9, 2012

(65) Prior Publication Data

US 2014/0007407 A1 Jan. 9, 2014

(51) Int. Cl.
*F16L 37/091* (2006.01)
*F16L 37/092* (2006.01)
*H02G 3/06* (2006.01)

(52) U.S. Cl.
CPC ............... *H02G 3/06* (2013.01); *F16L 37/092* (2013.01); *H02G 3/065* (2013.01); *Y10T 29/49879* (2013.01)

(58) Field of Classification Search
CPC ... F16L 37/091; F16L 37/0925; F16L 37/098; F16L 21/06; F16L 21/065
USPC ............................ 285/307, 322, 323; 174/660
See application file for complete search history.

(56) References Cited

U.S. PATENT DOCUMENTS

| 3,149,861 | A | | 9/1964 | Larsson | |
|---|---|---|---|---|---|
| 3,924,877 | A | * | 12/1975 | Leopold et al. | 285/340 |
| 4,005,883 | A | | 2/1977 | Guest | |
| 4,067,534 | A | | 1/1978 | Frey | |
| 4,657,286 | A | | 4/1987 | Guest | |
| 6,843,516 | B2 | * | 1/2005 | Bishop et al. | 285/420 |
| 6,988,747 | B2 | | 1/2006 | Allen et al. | |
| 7,290,804 | B2 | * | 11/2007 | Gehring et al. | 285/322 |
| 7,354,079 | B2 | | 4/2008 | Rehder et al. | |
| 7,980,600 | B2 | | 7/2011 | Hofmann | |
| 2001/0045749 | A1 | * | 11/2001 | Camozzi et al. | 285/322 |
| 2003/0102667 | A1 | * | 6/2003 | Weller et al. | 285/319 |
| 2004/0183302 | A1 | * | 9/2004 | Allen et al. | 285/322 |

* cited by examiner

*Primary Examiner* — James Hewitt
(74) *Attorney, Agent, or Firm* — Barnes & Thornburg LLP

(57) ABSTRACT

An electrical conduit coupling comprising a casing and first and second locks is provided. The casing includes opposed first and second openings, and first, second and third crimps. The first, second and third crimps are formed in the casing to provide a smaller diameter in the casing at each crimp. The first lock includes a flange and a plurality of fingers extending from the flange. Each finger includes a first surface and second surface opposite the first surface. A rise portion is located on the first surface of each finger and a tab surface extends from the second surface of each finger. Each finger includes a tip surface extending opposite the first surface and from the second surface.

6 Claims, 5 Drawing Sheets

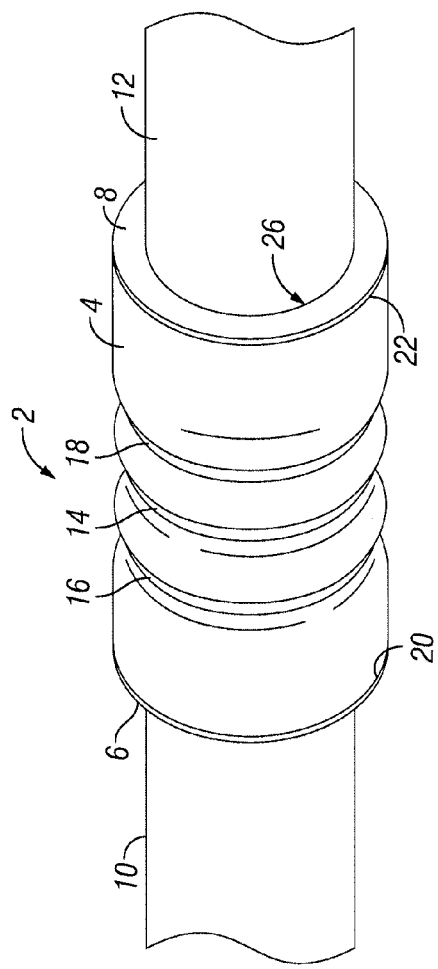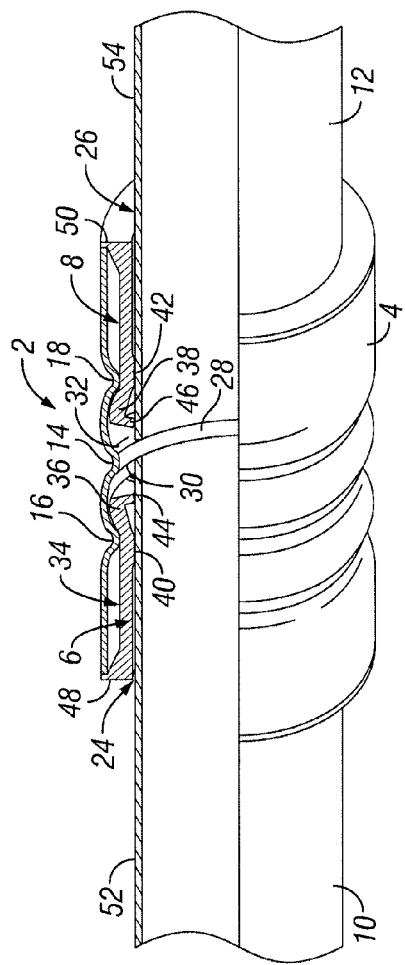

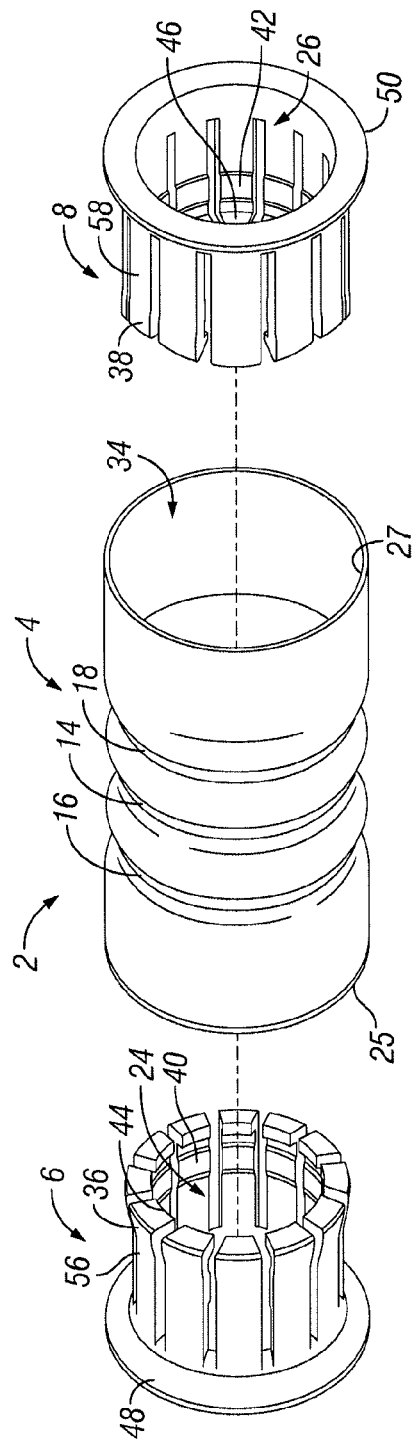
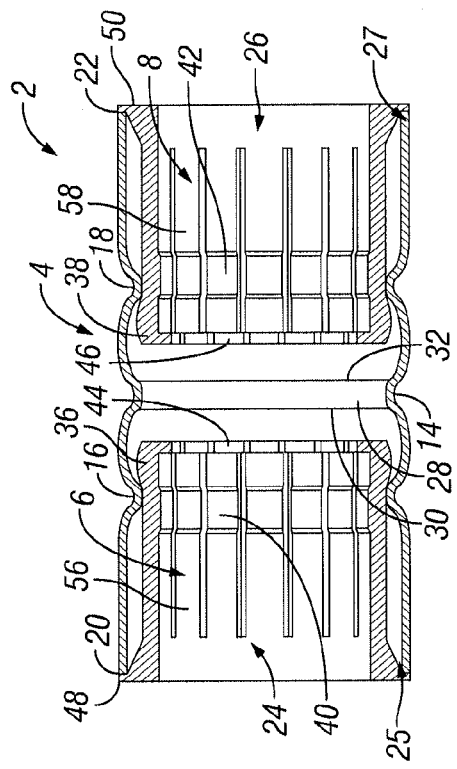
FIG. 3
FIG. 4

APPARATUS AND METHOD OF COUPLING ELECTRICAL CONDUIT

TECHNICAL FIELD

The present disclosure relates to electrical conduit couplings and more particularly to such couplings that engage the conduit employing a gripping lock.

BACKGROUND AND SUMMARY

Electrical couplings are devices that connect two shorter electrical conduits together in order to form a single, longer electrical conduit. Conventionally, non-threaded conduit couplings employ set screws that rotate into a housing that receives two ends of the conduit. Each screw engages one end of the conduit to hold it in place forming a single longer conduit. Though functional, these couplings involve a multi-step process to connect the two conduits together.

Original attempts at an alternative conduit coupling were unsuccessful. One attempt included two round pieces of tubing. One of the pieces had two straight sprigged pieces of metal which stuck out slightly beyond the edge of the tubing. At the end of the straight sprigged metal was an outward bend on each. The other piece of tubing had two slots cut out of it about one eighth of an inch from the edge so when pushed together with the other piece of tubing the bends on the edges of the sprigged metal will lock it together. This did not work because the two pieces of conduit would not fit flush together. In a similar design, one of the pieces of tubing had two pieces of straight metal that had slight aberrations at the end of them. These two pieces of metal stuck out about one half inch from the edge of the tubing. The other piece of round tubing had two pieces of metal that were attached to the inside of the tubing, so that when the other round piece of tubing was pushed up against it, the two straight pieces of metal would be inside the tubing. Twisting the tubes in opposite directions would lock them together. Again, however, the conduits would not fit flush up against each other.

Another failed attempt also consisted of two pieces of tubing. One tube had a smaller piece of tubing that stuck out of it about one inch. On the inside of the small tubing there were two drilled holes and inside the holes were two push buttons. The other tube had two bends that flared out and two holes drilled in it. The purpose of this was that when the two pieces of tubing came together, the bends allowed the buttons to be pushed in and the holes where the buttons would expand and lock into place. This version was too big and too bulky and did not make the conduits fit flush together.

Another failed attempt included using two different sizes of tubing; one that was larger than the other. The larger tubing was just a round tubing with some of it removed by machining its inside and middle. The other two pieces of tubing were smaller and flat on one side and had long straight cuts on the other side. These two pieces fit into each side of the larger tubing until the flat side abutted against the edge of the larger tubing. Pushing the conduit in on each side of the larger tubing would lock the conduit in. Pulling the conduit out would cause the smaller tubing to get tighter. Again the conduits would not fit flush up against each other. Similarly, this version was modified by rolling the large tube two times on the outside to make two small ribs on the inside. This was meant to hold the smaller pieces in on each side. The other two pieces of tubing were smaller and flat on one side and had long straight cuts on their other side. These two pieces fit into each side of the larger tubing until the flat side butts up against the edge of the larger tubing. Again, pushing the conduit in on each side should lock the conduit in. Again, however, the conduits did not fit flush up against each other.

The present disclosure includes an electrical conduit coupling configured to receive the ends of two separate conduits, and easily and securely join them together without any need for fasteners, set screws, tools, or multiple steps. An illustrative embodiment includes a casing having a larger diameter than the conduits. The casing has opposing open ends each configured to receive a corresponding end (or end portion) of a conduit. Illustratively, the casing may include a center crimp that reduces its diameter to about the diameter of the conduit, and to which the ends of the conduits are engagable thereby creating a continuous pass-through from one conduit to another. The casing may also have outer crimp rings located on each side of the center crimp ring also reducing the diameter of the casing at those locations. These outer crimp rings may be used as retainers for locks that fit in the casing and are located between the casing and the conduit. There is illustratively one lock for each end of the conduit. Each lock slides into one end of the casing engaging one of the outer crimp rings.

In an illustrative embodiment of each lock, a plurality of fingers extends from a cylindrical flange that fits around the periphery of the end of the conduit and the interior surface of the casing. Each finger includes an illustrative rise on its exterior periphery configured to engage one of the outer crimp rings. An illustrative finger tip extends inward toward the conduit surface to provide a grip on the conduit. A tab surface located on the interior of each finger is likewise configured to engage the surface of the conduit. This causes each finger to bias outwardly from the central axis of the lock when the conduit is inserted to assist the rise in engaging the crimp. The conduit pushes against the tab surfaces causing each finger to slightly separate. This separation allows the conduit to proceed past the finger tips and continue sliding in the casing until the conduit engages the center crimp. By separating the fingers, the rise on each finger wedges against the outer crimp ring to help hold the conduit securely in place. Each conduit operates in the same manner on each side of the casing to form the single longer conduit. These aforedescribed structures mean the installer may push a conduit into each lock on each side of the casing—that is all. There are no additional steps to be performed by the installer, such as fastening down multiple set screws.

To release the conduits from the coupling, the lock holding the coupling is pulled slightly from the casing to further wedge the rise on each finger against its outer crimp ring. Once this tight wedge is created, the lock is pushed back in against the casing. This creates enough give to allow the conduit to be pulled straight out from the lock. So long as the lock is held against the casing while the conduit is being pulled, the conduit will slide out of the lock. No tools or other equipment are needed to accomplish this, making it a much simpler task saving time and money on a construction job that may require many conduits to be coupled together.

Another illustrative embodiment of the present disclosure provides an electrical conduit coupling comprising a casing and first and second locks. The casing includes opposed first and second openings, and first, second and third crimps. The first, second and third crimps are formed in the casing to provide a smaller diameter in the casing at each crimp. The first lock includes a flange and a plurality of fingers extending from the flange. Each finger includes a first surface and second surface opposite the first surface. A rise portion is located on the first surface of each finger and a tab surface extends from the second surface of each finger. Each finger includes a tip surface extending opposite the first surface and from the second surface. The first lock is configured to be received in the first opening of the casing and the second lock is configured to be received in the second opening of the casing. The rise on each first surface of each finger of the first lock is configured to engage the first crimp of the casing and each first surface of each finger of the second lock is configured to engage the third crimp of the casing. The second crimp has first and second opposed sides wherein the first side is configured to engage a first conduit that is inserted into the first opening of the casing such that the first conduit has an outer surface that engages the rise portion and tip of each finger of the first lock. Likewise, the second side is configured to engage a second conduit that is inserted into the second opening of the casing wherein the second conduit has an outer surface that engages the rise portion and tip of each finger of the second lock.

In the above and other embodiments, the electrical conduit coupling may further comprise: the fingers of the first lock having at least a portion that is separated from each other, and wherein the fingers of the second lock have at least a portion that is separated from each other; the fingers of the first lock extend from its flange in a cylindrical pattern forming a passageway concentric with the first opening of the casing and the fingers of the second lock extend from its flange in a cylindrical pattern forming a passageway concentric with the second opening of the casing; each of the first, second and third crimps are circularly formed in the casing; each finger of the first lock includes the tip that extends from end of second surface toward the passageway and configured to engage a surface on the conduit.

Another illustrative embodiment of the present disclosure includes a method of coupling two conduits together, the method comprises the steps of: providing a casing having opposed first and second openings, and first, second and third crimps, wherein the first, second and third crimps are formed in the casing to provide a smaller diameter in the casing at each crimp, a first lock that includes a flange and a plurality of fingers extending from the flange, wherein each finger includes a first surface and second surface opposite the first surface, wherein a rise portion is located on the first surface of each finger and a tab surface extending from the second surface of each finger, herein each finger includes a tip surface extending opposite the first surface and from the second surface, wherein the first lock is located in the first opening of the casing and the second lock is located in the second opening of the casing, wherein the rise on each first surface of each finger of the first lock is engagable with the first crimp of the casing and each first surface of each finger of the second lock is engagable with the third crimp of the casing, wherein the second crimp has first and second opposed sides; inserting a first conduit into the first opening of the casing and engaging the tab surface and tip of each finger of the first lock to move each finger toward the first crimp until the conduit engages the first surface of the second crimp; and inserting a second conduit into the second opening of the casing and engaging the tab surface and tip of each finger of the second lock to move each finger toward the third crimp until the conduit engages the second surface of the second crimp.

Additional features and advantages of the coupling assembly will become apparent to those skilled in the art upon consideration of the following detailed description of the illustrated embodiment exemplifying the best mode of carrying out the coupling assembly as presently perceived.

BRIEF DESCRIPTION OF DRAWINGS

The illustrative apparatus and method will be described hereafter with reference to the attached drawings which are given as non-limiting examples only, in which:

FIG. 1 is a perspective view of an illustrative embodiment of an electrical conduit coupling with joined conduits extending out therefrom;

FIG. 2 is a partial cross-sectional view of the conduit coupling of FIG. 1 showing the positioning of the conduit inside the coupling along with the locks;

FIG. 3 is an exploded perspective view of the electrical conduit coupling of FIG. 1;

FIG. 4 is a side cross-sectional view showing the electrical conduit coupling with the locks inserted therein;

FIGS. 5a-c are separated from the electrical conduit coupling of FIG. 1.

Figure 5A:
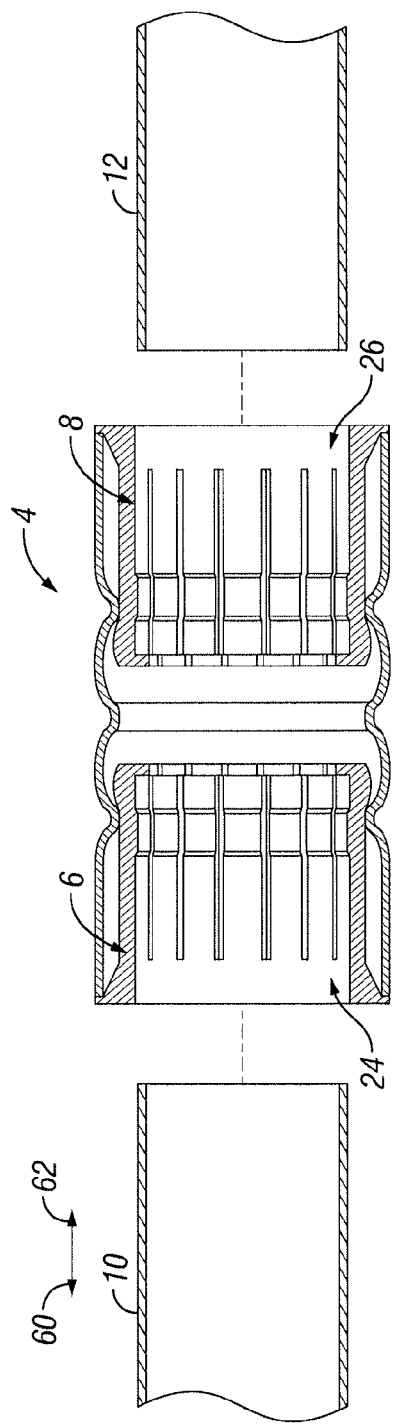
FIGS. 5a-c are cross-sectional progression views demonstrating how two electrical conduits are inserted into opposed ends of the electrical conduit coupling of FIG. 1 to couple the conduits together.

Corresponding reference characters indicate corresponding parts throughout the several views. The exemplification set out herein illustrates embodiments of the apparatus and method of coupling electrical conduit, and such exemplification is not to be construed as limiting the scope of the apparatus and method of coupling electrical conduit in any manner.

DETAILED DESCRIPTION OF THE DRAWINGS

A perspective view of electrical conduit coupling 2 with conduits 10 and 12 extending therefrom is shown in FIG. 1. In this illustrative embodiment, a casing 4 receives locks 6 and 8 which themselves receive conduits 10 and 12 to hold in place forming a single longer conduit. A central crimp 14 is formed in casing 4 to reduce the diameter of same to serve as a stop for conduits 10 and 12 and to produce a uniform pass-through between conduits 10 and 12. (See also FIG. 2.) Crimps 16 and 18 are similarly formed in casing 4 reducing the localized diameter thereof. Crimps 16 and 18 may be shallower than crimp 14. In contrast to stopping conduits 10 and 12, however, crimps 16 and 18 are configured to engage a portion of locks 6 and 8, respectively, to assist them in holding and releasing conduits 10 and 12, as described further herein. Locks 6 and 8 are cylindrical structures located partially within casing 4 capping the outer peripheries 20 and 22 of casing 4 by flanges 48 and 50, respectively. Like casing 4, locks 6 and 8 have openings 24 and 26 (see also FIG. 2) that receive conduits 10 and 12, respectively. It is appreciated from this view that conduits 10 and 12 are joined to form a constructively single longer conduit by using three structures—casing 4, and locks 6 and 8. To connect conduits 10 and 12 together, no tools are necessary, no screws or bolts to fasten, no adhesive to apply. As will be discussed further herein, all that is needed is to simply push conduit 10 into one side of coupling 2 and push conduit 12 into the other side of coupling 2, that's all. This creates a much simpler method of creating the longer conduit.

A partial cross-sectional view of conduit coupling 2 depicting conduits 10 and 12 held or locked forming an extended conduit structure, is shown in FIG. 2. This view demonstrates how crimps 14, 16, and 18 engage conduits 10 and 12, and locks 6 and 8, respectively. For example, with respect to crimp 14, a surface 28 is formed in the interior surface of casing 4 along with side edges 30 and 32. As shown, conduit 10 engages edge 30 while conduit 12 engages edge 32. Surface 28 maintains a pass-through for conduits 10 and 12. This figure shows how a complete pass-through is made from conduit 10, surface 28, and conduit 12. This view also shows how locks 6 and 8 are positioned within interior 34 of casing 4. Each lock 6 and 8 includes a rise portion 36 and 38, respectively, tabs 40 and 42, respectively, tips 44 and 46, respectively, and flanges 48 and 50, respectively. As discussed further herein, rise portions 36 and 38 are configured to engage crimps 16 and 18, respectively. Tabs 40 and 42, and tips 44 and 46 are configured to engage outer surfaces 52 and 54 of conduit 10 and 12, respectively.

An exploded perspective view of coupling assembly 2 is shown in FIG. 3. This view shows casing 4 with central crimp 14 and crimps 16 and 18 formed therein. Openings 25 and 27 reveal interior 34 which is configured to receive locks 6 and 8, respectively. Rise portion 36 and tip 44 are located on each of a plurality of fingers 56 that extends from flange 48. In this illustrative embodiment, there are a plurality of fingers formed concentrically from flange 48 forming opening 24. It is appreciated that based on the size of the opening needed and the gripping characteristics more or fewer fingers may be employed. This view of lock 6 also shows how each finger 56 includes a tab 40 as introduced in FIG. 2. Illustratively, each of the fingers 56 includes this tab 40. The concentric arrangement of the fingers allows an even and balanced grip onto outer surface 52 of conduit 10. With respect to lock 8, it includes illustratively the same plurality of fingers 58, like fingers 56 of lock 6. Each finger 58, likewise, includes a rise 38, tips 46 and tabs 42. It is appreciated that in some embodiments lock 8 is identical to lock 6—just inserted into the opposite opening 27 of casing 4.

A side cross-sectional view of conduit coupling 2 fully assembled (without the conduits inserted), is shown in FIG. 4. It is appreciated from this view how the concentrically formed crimps 16 and 18 may be employed to engage all the similarly concentrically formed fingers 56 when inserted into opening 25. Also shown in this view is how flange 48 engages the outer periphery 20 of casing 4. Similarly, fingers 58 of lock 8 concentrically engage crimp 18 when inserted into opening 27. Flange 50 butts against periphery 22 of casing 4 the same as flange 48 as previously discussed. This view also demonstrates how tabs 40 and 42, as well as tips 44 and 46 point inwardly. Lastly, this view shows how central crimp 14 forms surface 28, as well as edges 30 and 32. It is appreciated that although rises 36 and 38 from each of fingers 56 and 58 engage crimps 16 and 18, respectively, fingers 56 and 58 are biasable enough inward so locks 6 and 8 may be pulled out of casing 4 when there is no conduit located therein.

Figure 5B:
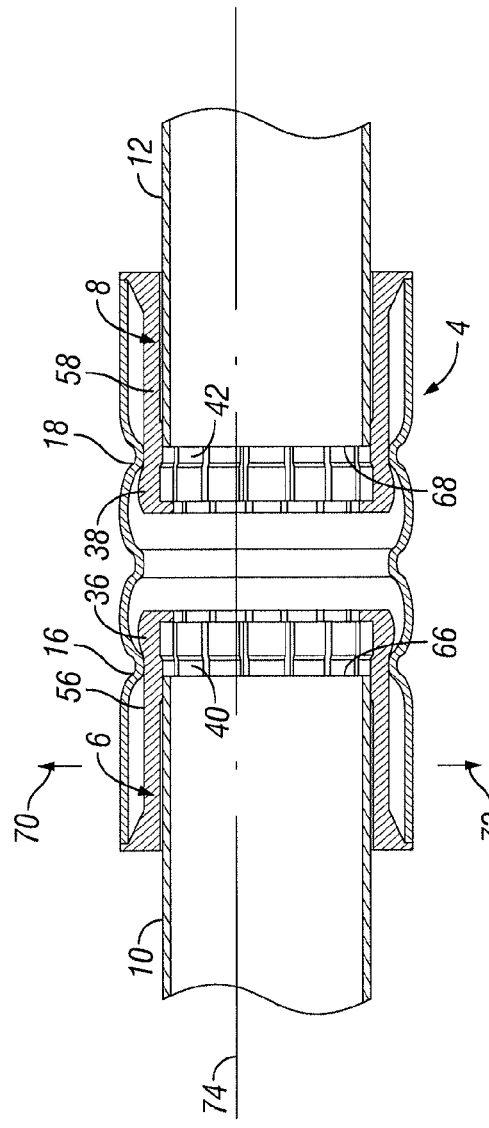
Figure 5C:
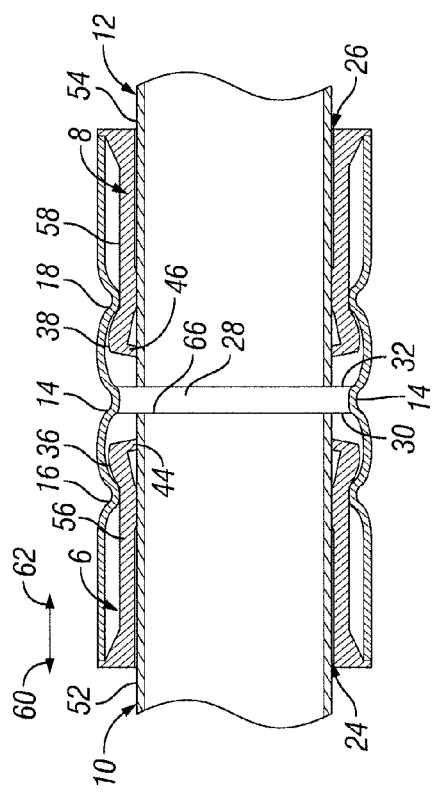

Cross-sectional progression views showing how electrical conduits 10 and 12 are inserted into opposed openings 24 and 26 of locks 6 and 8 in casing 4 to connect conduits 10 and 12 together are shown in FIGS. 5a through c. As shown in FIG. 5a, coupling assembly 2 with locks 6 and 8 located therein is essentially configured as that described in FIG. 4. This being the case, conduits 10 and 12 are moved in directions 62 and 60, respectively, into openings 24 and 26, respectively, of locks 6 and 8, respectively. In other words, conduits 10 and 12 are each pushed into their respective locks 6 and 8 at openings 24 and 26, respectively.

The view in FIG. 5b depicts conduits 10 and 12 inserted into locks 6 and 8, respectively. In particular, here edge 66 at the end of conduit 10 is shown engaging tabs 40 from all of fingers 56. This has the effect of pushing those fingers outward in directions 70 and 72, as shown. It is appreciated that although this view is cross-sectional, what is meant by directions 70 and 72 is that each of fingers 56 of lock 6 move out concentrically from the center axis of lock 6 or center axis 74. As this happens, rise portion 36 from each of fingers 56 is likewise pushed against crimp 16. This press fitting into lock 6 and expanding fingers 56 into crimp 16 begins the process of locking conduit 10 into casing 4.

On the other side of casing 4, the same process is initiated. Conduit 12 is pushed into opening 26 of lock 8, such that its edge 68 engages each tab 42 on fingers 58, causing them to move concentrically outward such as in directions 70 and 72 to cause each finger 58 rise portion 38 to engage crimp 18.

As shown in FIG. 5c, continuing to push conduit 10 in direction 62, causes it to push past tips 44 on each of fingers 56 extending completely through opening 24 formed in lock 6 until edge 66 of conduit 10 engages edge 30 of central crimp 14. This has the effect of not only pushing fingers 56 outward, but pushing rise portion 36 further outward so it secures against crimp 16. In addition, finger 44 biases down against surface 52 of conduit 10 to hold the same securely in place. Conduit 10 is now aligned with surface 28 of central crimp 14 and will not pull out if tugged in direction 60. Again, with regard to conduit 12, it is pushed through opening 26 until it passes through tips 46 of fingers 58 causing its rise 38 to further engage or wedge against crimp 18 securing lock 8 in place. Furthermore, tip 46 is biased against surface 54 on conduit 12 so as conduit 12 is pushed against edge 32 of central crimp 14, tip 46 can dig into surface 54 to help hold conduit 12 in place. As FIG. 5c shows, there is now a complete pass-through between conduit 10, surface 28 of central crimp 14 and conduit 12. It is appreciated that this creates a conduit that's sum total is longer than the individual conduits 10 and 12. In this position, conduits 10 and 12 are prevented from moving. No tools or other devices were needed in order to secure conduits 10 and 12 together.

Figure 6A:
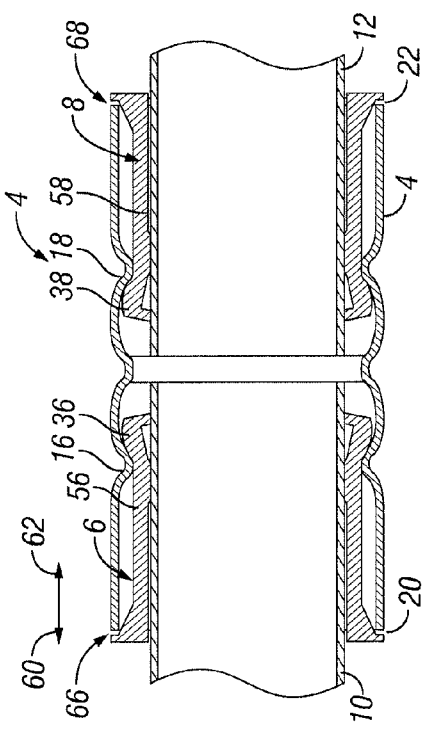
FIGS. 6a-c are cross-sectional progression views demonstrating how the two conduits that were coupled per
Figure 6B:
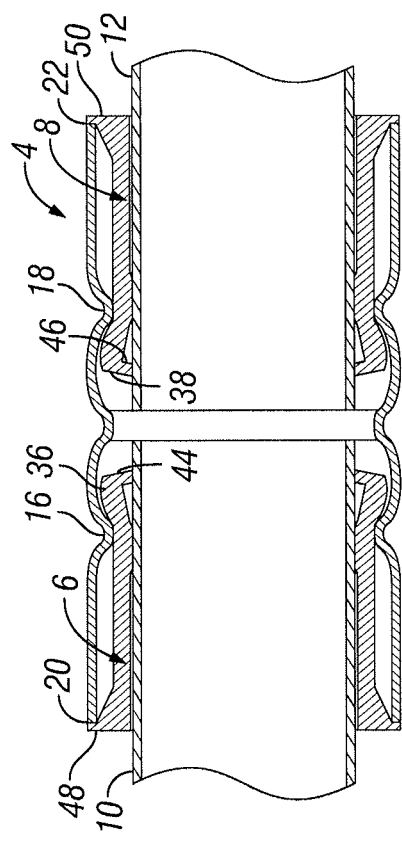
Figure 6C:
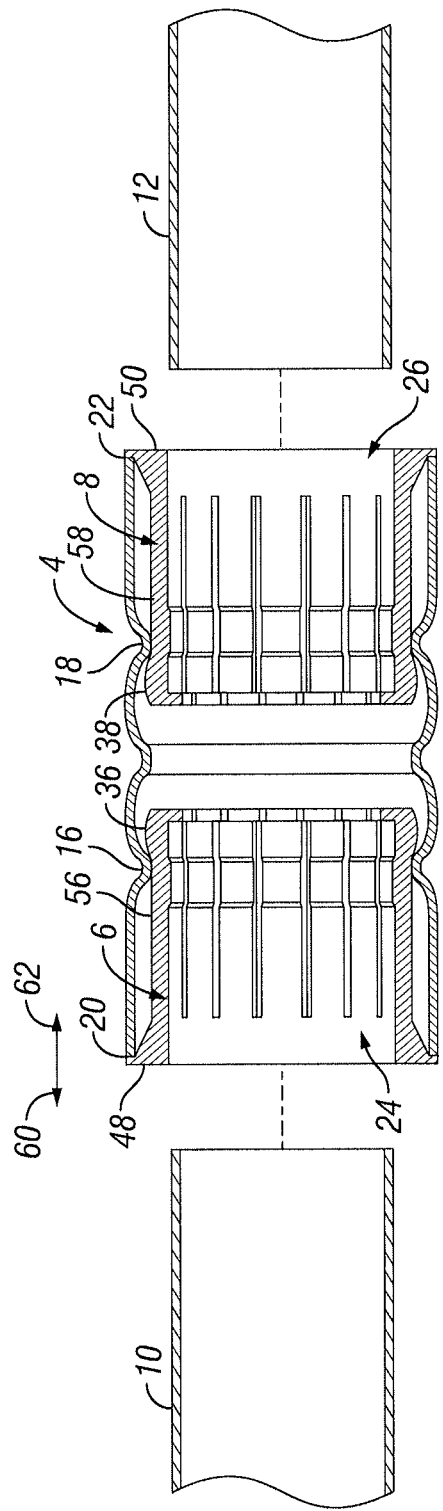

Cross-sectional progression views showing how conduits 10 and 12 are removed from conduit coupling 4 is shown in FIG. 6a through c. Removing conduits 10 and 12 from coupling 4, likewise, requires no additional tools or devices. As conduits 10 and 12 are secured together as shown in FIG. 5c, it is appreciated that the biasing nature of fingers 56 and 58 from locks 6 and 8, respectively, allow a slight amount of movement of locks 6 and 8 in directions 60 and 62. Accordingly, the first step in removing conduits 10 and 12 from coupling 4 includes exploiting that play between casing 4 and locks 6 and 8. Each of locks 6 and 8 are pulled away from the outer peripheries 20 and 22, respectively, of casing 4 to create a slight gap 66 and 68, respectively, as shown in FIG. 6a. When this occurs, conduits 10 and 12 do may only move slightly. Locks 6 and 8 may be slightly movable with respect to conduits 10 and 12, respectively. In the case of lock 6, pulling it in direction 60 forces rise portion 36 to wedge more securely against crimp 16. This eliminates the play previously described. Likewise, pulling lock 8 in direction 62 causes the rise portion 38 from each of fingers 58 to wedge against crimp 18, thereby reducing the play between lock 8 and casing 4. It is appreciated that this occurs around casing 4 with each of the fingers 56 and 58.

After locks 6 and 8 are pulled slightly from casing 4 to create gaps 66 and 68, they are pushed back into casing 4 as shown in FIG. 6b. Here flanges 48 and 50 are again abutted against peripheries 20 and 22 of casing 4. By doing this, rise portions 36 and 38 again have play with respect to crimps 16 and 18, respectively. This has the effect of weakening the grip finger tips 44 and 46 have on conduits 10 and 12, respectively. A result of this weakened grip, conduits 10 and 12 may now be removed from locks 6 and 8, respectively, of casing 4.

The view in FIG. 6c shows conduits 10 and 12 extracted from locks 6 and 8, respectively. To accomplish this, flange 48 of lock 6 is held against outer periphery 20 of casing 4. This prevents lock 6 from pulling away from casing 4 rewedging rise portion 36 against crimp 16 and causing lock 6 to grip against conduit 10 again. With lock 6 held against outer periphery 20, the combination of the play in fingers 56 with respect to wedge 16 and the weakened grip, conduit 10 may be pulled in direction 60 and completely removed from lock 6. Likewise, with flange 50 held against outer periphery 22 of casing 4, the play between rise 38 from each of finger 58 and crimp 18 combined with the weakened grip against conduit 12, allows it to be moved in direction 62 and pulled out of lock 8. This occurs so long as rise portion 38 is not rewedged against crimp 18 as conduit 12 is being pulled out of opening 26.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. An electrical conduit coupling comprising:
   a casing having opposed first and second openings, and first, second and third crimps;
   wherein the first, second and third crimps are formed in the casing to provide a smaller diameter in the casing at each crimp;
   a first lock that includes a flange and a plurality of fingers extending from the flange;
   a second lock that includes a flange and a plurality of fingers extending from the flange;
   wherein each finger includes a first surface and second surface opposite the first surface, wherein a rise portion is located on the first surface of each finger and a tab surface extends from the second surface of each finger;
   wherein each finger includes a tip extending opposite the first surface and from the second surface;
   wherein the first lock is configured to be received in the first opening of the casing and the second lock is configured to be received in the second opening of the casing;
   wherein the rise portion on each first surface of each finger of the first lock is configured to engage the first crimp of the casing and each first surface of each finger of the second lock is configured to engage the third crimp of the casing; and
   wherein the second crimp has first and second opposed sides wherein the first side is configured to engage a first conduit that is inserted into the first opening of the casing wherein the first conduit has an outer surface that engages the rise portion and tip of each finger of the first lock and wherein the second side is configured to engage a second conduit that is inserted into the second opening of the casing wherein the second conduit has an outer surface that engages the rise portion and tip of each finger of the second lock.

2. The electrical conduit coupling of claim 1, wherein the fingers of the first lock have at least a portion that is separated from each other, and wherein the fingers of the second lock have at least a portion that is separated from each other.

3. The electrical conduit coupling of claim 1, wherein the fingers of the first lock extend from its flange in a cylindrical pattern forming a passageway concentric with the first opening of the casing and the fingers of the second lock extend from its flange in a cylindrical pattern forming a passageway concentric with the second opening of the casing.

4. The electrical conduit coupling of claim 3, wherein each of the first, second and third crimps are circularly formed in the casing.

5. The electrical conduit coupling of claim 3, wherein the tip of each finger on each of the first and second locks extends from the end of the second surface toward the passageway.

6. A method of coupling two conduits together, the method comprising the steps of:
   providing a casing having opposed first and second openings, and first, second and third crimps, wherein the first, second and third crimps are formed in the casing to provide a smaller diameter in the casing at each crimp, a first lock that includes a flange and a plurality of fingers extending from the flange, a second lock that includes a flange and a plurality of fingers extending from the flange, wherein each finger includes a first surface and second surface opposite the first surface, wherein a rise portion is located on the first surface of each finger and a tab surface extends from the second surface of each finger, wherein each finger includes a tip extending opposite the first surface and from the second surface, wherein the first lock is located in the first opening of the casing and the second lock is located in the second opening of the casing, wherein the rise portion on each first surface of each finger of the first lock is engagable with the first crimp of the casing and each first surface of each finger of the second lock is engagable with the third crimp of the casing, wherein the second crimp has first and second opposed sides;
   inserting a first conduit into the first opening of the casing and engaging the tab surface and tip of each finger of the first lock to move each finger toward the first crimp until the conduit engages the first surface of the second crimp; and
   inserting a second conduit into the second opening of the casing and engaging the tab surface and tip of each finger of the second lock to move each finger toward the third crimp until the conduit engages the second surface of the second crimp.

* * * * *